July 20, 1965 R. A. FROEHLIG 3,196,069

LAMINATING MACHINE

Filed April 21, 1961

INVENTOR.
RUDOLPH A. FROEHLIG
BY
[signature]
ATTORNEY 3,196,069

LAMINATING MACHINE

Rudolph A. Froehlig, Little Neck, N.Y., assignor to Modern Album and Finishing, Inc., Long Island, N.Y., a corporation of New York Filed Apr. 21, 1961, Ser. No. 104,602
1 Claim. (Cl. 156—547)

The present invention relates to a laminating machine and more particularly to a machine for applying a transparent protective covering on a printed sheet.

Phonograph record album jackets and other similar articles usually have a design printed thereon to give certain pertinent information regarding the album and the design often embodies a picture of the recording artist or some fanciful picture. Such albums are extensively handled so that it is necessary to protect the design to preserve the pleasant appearance thereof.

It is common practice to protect the design by adhering a transparent sheet of material to the face of the print. Heretofore, it has been difficult to obtain a secure bond which will be uniform throughout the surface of the design. The adhesive used has a tendency to form streaks in the design due to uneven distribution of the adhesive and character of the paper on which the transparent sheet is applied. These disadvantages are particularly true when the designs which are to be laminated are assembled in a stack and fed to the laminating machine individually.

The present invention overcomes these defects and has for one of its objects the provision of an improved laminating machine which will apply a thin transparent sheet on each print.

Another object of the present invention is to provide an improved laminating machine wherein the transparent sheet is adhered to the design by a uniform bond without producing any streaks.

Another object of the present invention is to provide an improved laminating mechanism in which the adhesive is applied uniformly throughout the face of the print.

Another object of the present invention is to provide an improved laminating mechanism wherein the transparent sheet will be securely bonded to the print regardless of the type of paper used for the print.

Another object of the present invention is to provide an improved laminating mechanism which does not require any special or elaborate drying mechanism to dry the adhesive.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Figures 1, 2, 3:
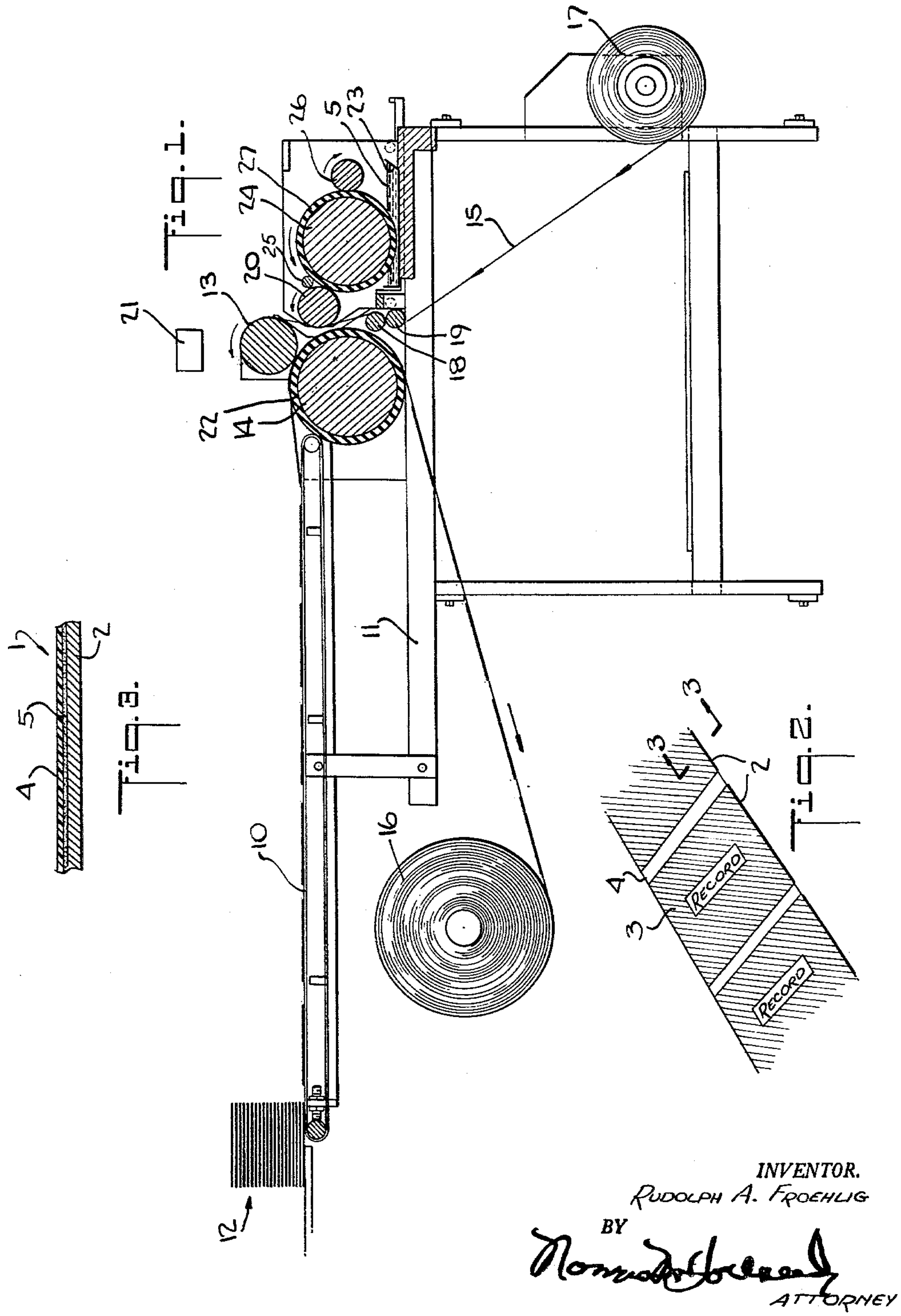
FIG. 1 is a sectional view of the laminating machine which is the subject matter of the present invention.
FIG. 2 is a perspective view showing the position of the print on the laminate after the two have been combined.
FIG. 3 is an exaggerated sectional view taken along line 3—3 of FIG. 2 showing the design with the lamination on it.

Referring first to FIG. 3, which is a sectional view of the finished product, the laminated print, generally designated by the reference character 1, comprises a backer or base sheet 2, which has a suitable design 3 (FIG. 2) thereon, to which is adhered a transparent sheet 4 by a transparent adhesive 5. The transparent sheet 4 will protect the design 3 on the backer 2 during handling.

Referring more particularly to FIG. 1 of the drawing, the laminating machine for applying the transparent sheet 4 to the backer 2 comprises a conveyor 10 mounted on a suitable frame 11 which receives the printed backers 2 from a suitable stack 12. The printed sheets or backers 2 are carried by the conveyor 10 between a pair of nip rolls 13 and 14 which will bring the printed sheets 2 into contact with a continuous transparent web 15 to which the adhesive has been applied, so as to adhere the printed side 3 of the backer 2 to the transparent web 15. The web 15 with the printed sheets 2 adhered thereto is then taken up on a suitable take-up roll 16 to dry. After drying, the web 15 is cut between the printed sheets 2 to form the finished article comprising a printed sheet 2 to which is adhered the transparent sheet 4 by an adhesive 5, as shown in FIG. 3.

The transparent web 15 may be made of any suitable transparent material, such as vinyl acetate, and is supplied from a suitable supply roll 17. The continuous web 15 passes between guide rollers 18 and 19 and thereafter brushes against adhesive-applying roller 20, which applies a coating of adhesive to the transparent web 15. The web 15 moves in a direction opposite to the direction of motion of adhesive applying roller 20, so that the adhesive is transferred by a wiping action. The web 15 then travels over nip roll 13 above which is located a pre-heater 21 which initiates the drying of the adhesive. At the point of contact between nip rolls 13 and 14, the printed sheets 2 are applied to the transparent web 15 to which they are adhered by the adhesive.

It has been found that excellent results have been obtained by making the nip roller 13 of a metal, such as steel, and by providing the nip roller 14 with a rubber covering or blanket 22 and by making it approximately two times the diameter of the nip roller 13.

The adhesive preferably used with the present invention is polyvinyl chloride which has a milky-white appearance in solution, but is transparent when it dries. However, it will be understood that other transparent adhesives may also be used with the present invention. The adhesive 5 is supplied to the transparent web 15 from a glue pan 23 through intermediation of adhesive roller 24, spreader roller 25 and adhesive applying roller 20.

A doctor roller 26 is in contact with the adhesive roller 24 and removes excess adhesives therefrom. The doctor roller 26 is preferably made of metal, which may be chrome plated, and the adhesive roller 24 is preferably provided with a rubber covering or blanket 27 and rotates at about twice the speed of the doctor roller 26.

The adhesive 5 is then transferred to the applying roller 20 which is preferably made of chrome plated metal and which is moving at the same surface speed as the adhesive roller 24 in the same direction to positively have the adhesive transferred thereto.

The spreader roller 25 is idly mounted between the applying roller 20 and the adhesive roller 24 to spread the adhesive uniformly over the adhesive roller 24 before it is transferred to the applying roller 20. Thus, the applying roller 20 is supplied with a thin substantially uniform layer of adhesive which is transferred to the web 15 to give the web 15 a uniform film of adhesive.

As will be obvious from the above description, the operation of the present invention comprises the moving of the transparent web 15 in the direction of the arrow against the applying roller 20 which rotates in the opposite direction. The adhesive is fed by the adhesive roller 24 to the applying roller 20 after the idle doctor roller 25 has spread the adhesive into a uniform thin film. The applying roller 20 then transfers the film of adhesive to the transparent web 15, which is then moved between the nip rollers 13 and 14 where the printed sheets 2 are applied thereto to be adhered to the web. As the adhesive dries, it becomes transparent and a uniformly bonded laminate results.

It will be seen that the present invention provides an improved laminating machine which will apply a thin transparent sheet on each print which is uniformly bonded thereto throughout the entire surface to give it a maximum protection.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

In a laminating machine for adhering printed sheet to a transparent web, a framework having a pair of nip rollers thereon, means for supplying printed sheets between said nip rollers, means for supplying a continuous transparent web between said nip rollers, an adhesive-applying roller in contact with said web and rotating in a direction opposite to the direction of the web for applying an adhesive to said transparent web, an adhesive roller having a resilient surface in contact with said adhesive-applying roller and moving at the same surface speed and being adapted to receive adhesive from a source and transfer it to the applying roller, the axes of said adhesive roller and said adhesive applying roller being parallel to each other on a substantially horizontal plane so that a plane through the tangent line between said adhesive roller and said adhesive applying roller is in a generally upright direction, a doctor roller in contact with the adhesive roller to remove excess adhesive from the adhesive roller, and an idle spreader roller supported by, resting on top of, and in contact with both said adhesive roller and said applying roller to spread the adhesive uniformly over the adhesive applying roller, said spreader roller being completely free from and unattached to the framework of said machine and being intersected by the upright plane through the tangent line between said adhesive roller and said adhesive applying roller.

References Cited by the Examiner

UNITED STATES PATENTS

| | | | |
|---|---|---|---|
| 1,903,325 | 4/33 | Colbert et al. | 118—244 |
| 2,276,958 | 3/42 | Goldsmith | 156—552 X |
| 2,316,531 | 4/43 | Nivling | 118—244 |
| 2,681,636 | 6/54 | Fridolph | 118—262 X |
| 2,706,699 | 4/55 | Plansoen et al. | 156—332 X |
| 2,970,564 | 2/61 | Warner | 118—249 |

EARL M. BERGERT, *Primary Examiner.*